(12) United States Patent  (10) Patent No.: US 8,311,764 B1
Robillard et al.  (45) Date of Patent: Nov. 13, 2012

(54) SYSTEM AND METHOD FOR APPROXIMATING AMBIENT TEMPERATURE

(75) Inventors: Michael Robillard, Shrewsbury, MA (US); John K. Bowman, Brighton, MA (US); James W. Espy, Andover, MA (US); Steven R. Cieluch, Allston, MA (US); David Boudreau, Methuen, MA (US); Joseph P. King, Sterling, MA (US); Robert M. Beauchamp, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 395 days.

(21) Appl. No.: 12/640,732

(22) Filed: Dec. 17, 2009

(51) Int. Cl.
  *G01K 11/00* (2006.01)
(52) U.S. Cl. ..................................................... 702/130
(58) Field of Classification Search .................. 702/130, 702/182–185
  See application file for complete search history.

(56) References Cited

U.S. PATENT DOCUMENTS

| | | | |
|---|---|---|---|
| 6,363,449 | B1 | 3/2002 | Sides et al. |
| 6,545,438 | B1 | 4/2003 | Mays, II |
| 6,604,207 | B2 | 8/2003 | Sheikh et al. |
| 7,577,767 | B1 | 8/2009 | Robillard et al. |
| 7,988,063 | B1 | 8/2011 | Dufresne, II et al. |
| 2002/0042896 | A1 | 4/2002 | Johnson et al. |
| 2002/0054477 | A1 | 5/2002 | Coffey et al. |
| 2003/0214781 | A1 | 11/2003 | Kolb et al. |
| 2004/0193791 | A1 | 9/2004 | Felton et al. |
| 2009/0296342 | A1* | 12/2009 | Matteson et al. ........ 361/679.46 |

* cited by examiner

*Primary Examiner* — Edward Raymond
(74) *Attorney, Agent, or Firm* — Holland & Knight LLP; Brian J. Colandreo, Esq.; Mark H. Whittenberger, Esq.

(57) ABSTRACT

A method and computer program product for determining an internal temperature of a computing device, a power consumption factor for the computing device, and an airflow factor for the computing device. An approximated ambient air temperature is generated based upon the internal temperature, power consumption factor, and the airflow factor.

22 Claims, 3 Drawing Sheets

SYSTEM AND METHOD FOR APPROXIMATING AMBIENT TEMPERATURE

TECHNICAL FIELD

This disclosure relates to temperature approximation and, more particularly, to temperature approximation proximate an electronic device.

BACKGROUND

Within data centers, it is often important to monitor the temperature of the various devices within the data center. For example, in the event of the failure of a cooling fan within an electronic device, the temperature within the electronic device will rise. Sensing this increase in temperature, a temperature alarm may be triggered, alerting the appropriate IT person to the situation.

It may be desirable to be aware of not only the temperature of the electronic components within the data center, but also to the ambient temperature of the data center itself. Unfortunately, such measurement often require the use of temperature sensors positioned about the data center or temperature sensors external to the electronic devices.

SUMMARY OF DISCLOSURE

In one implementation, a method of approximating ambient temperature includes determining an internal temperature of a computing device, a power consumption factor for the computing device, and an airflow factor for the computing device. An approximated ambient air temperature is generated based upon the internal temperature, power consumption factor, and the airflow factor.

One or more of the following features may be included. Determining an internal temperature may include determining a midplane temperature. Determining an internal temperature may include determining an exhaust temperature. Determining an airflow factor may include monitoring a rotational speed of one or more cooling fans. Determining a power consumption factor may include determining a total power consumption of the computing device. Determining a power consumption factor further may include subtracting, from the total power consumption of the computing device, a total power consumption of non-disk drive devices. Generating an approximated ambient air temperature may include: determining a differential temperature; and subtracting the differential temperature from the internal temperature to define the approximated ambient air temperature. Determining a differential temperature may include determining the quotient of the power consumption factor and the airflow factor. Determining a differential temperature further may include: determining a product of the quotient and a first constant and adding the product to a second constant. At least one of the first and second constants may be determined empirically.

In another implementation of this disclosure, a computer program product resides on a computer readable medium and has a plurality of instructions stored on it. When executed by a processor, the instructions cause the processor to perform operations including determining an internal temperature of a computing device, a power consumption factor for the computing device, and an airflow factor for the computing device. An approximated ambient air temperature is generated based upon the internal temperature, power consumption factor, and the airflow factor.

One or more of the following features may be included. Determining an internal temperature may include determining a midplane temperature. Determining an internal temperature may include determining an exhaust temperature. Determining an airflow factor may include monitoring a rotational speed of one or more cooling fans. Determining a power consumption factor may include determining a total power consumption of the computing device. Determining a power consumption factor further may include subtracting, from the total power consumption of the computing device, a total power consumption of non-disk drive devices. Generating an approximated ambient air temperature may include: determining a differential temperature; and subtracting the differential temperature from the internal temperature to define the approximated ambient air temperature. Determining a differential temperature may include determining the quotient of the power consumption factor and the airflow factor. Determining a differential temperature further may include: determining a product of the quotient and a first constant and adding the product to a second constant. At least one of the first and second constants may be determined empirically.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
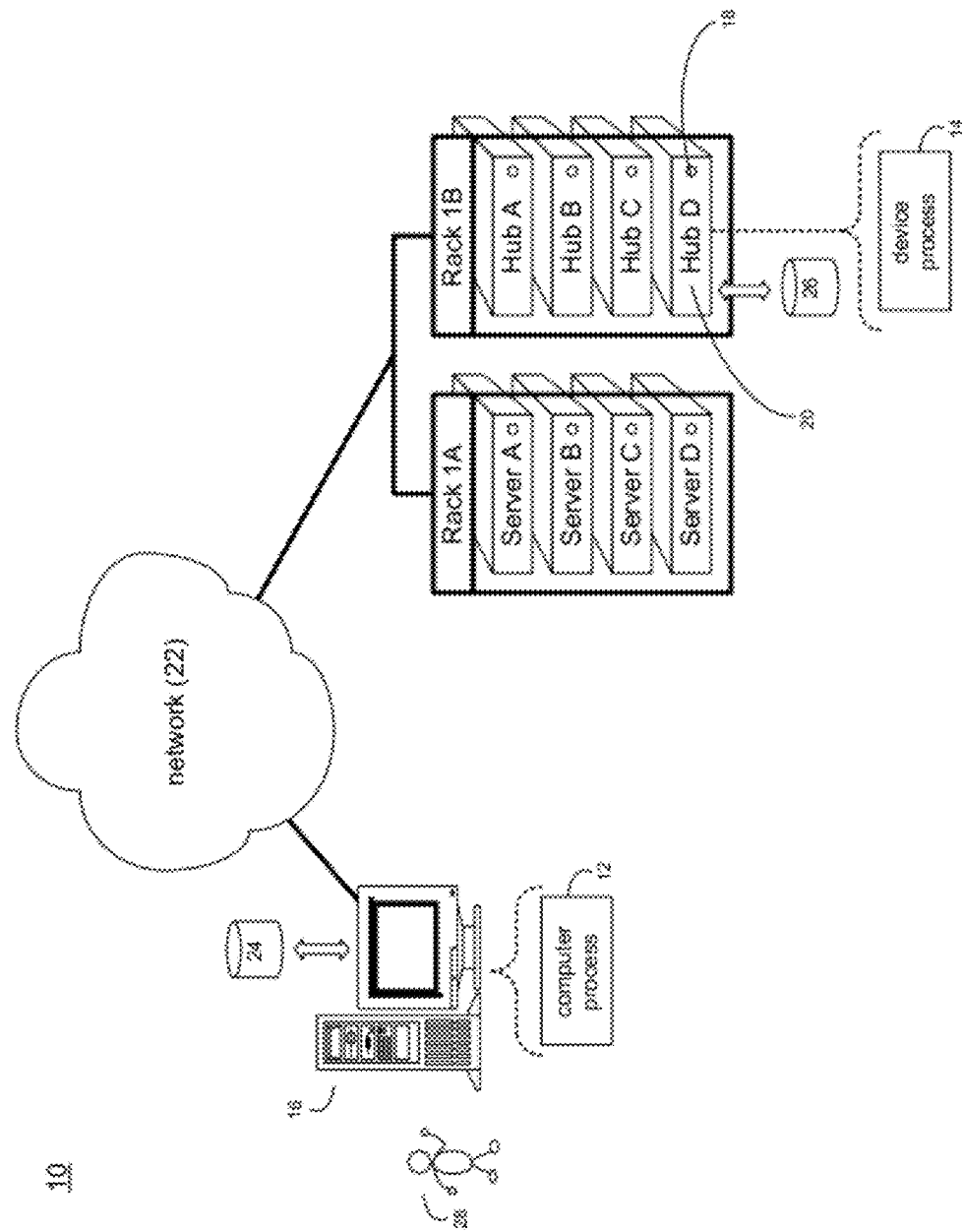
FIG. 1 is a diagrammatic view of a temperature calculation process executed in whole or in part by a device coupled to a distributed computing network.
Figure 2:
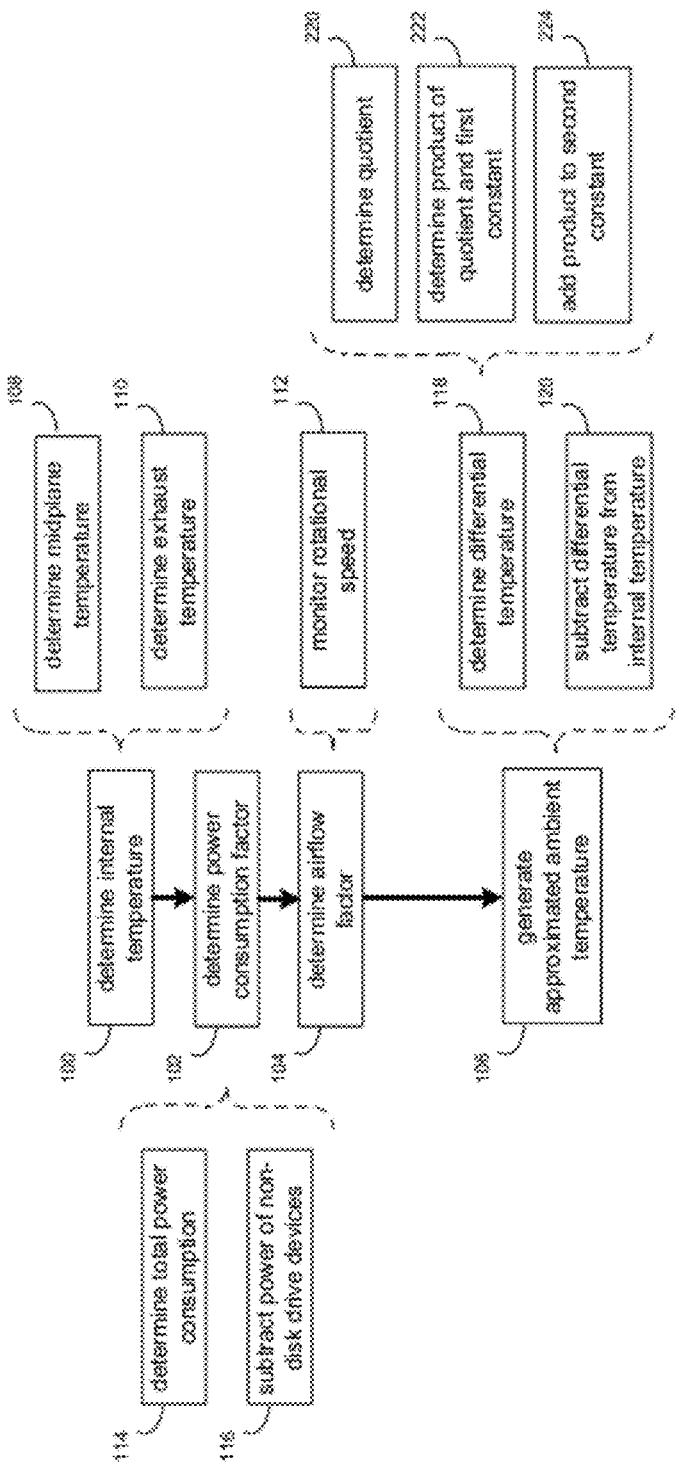
FIG. 2 is a flowchart of the temperature calculation process of FIG. 1.
Figure 3:
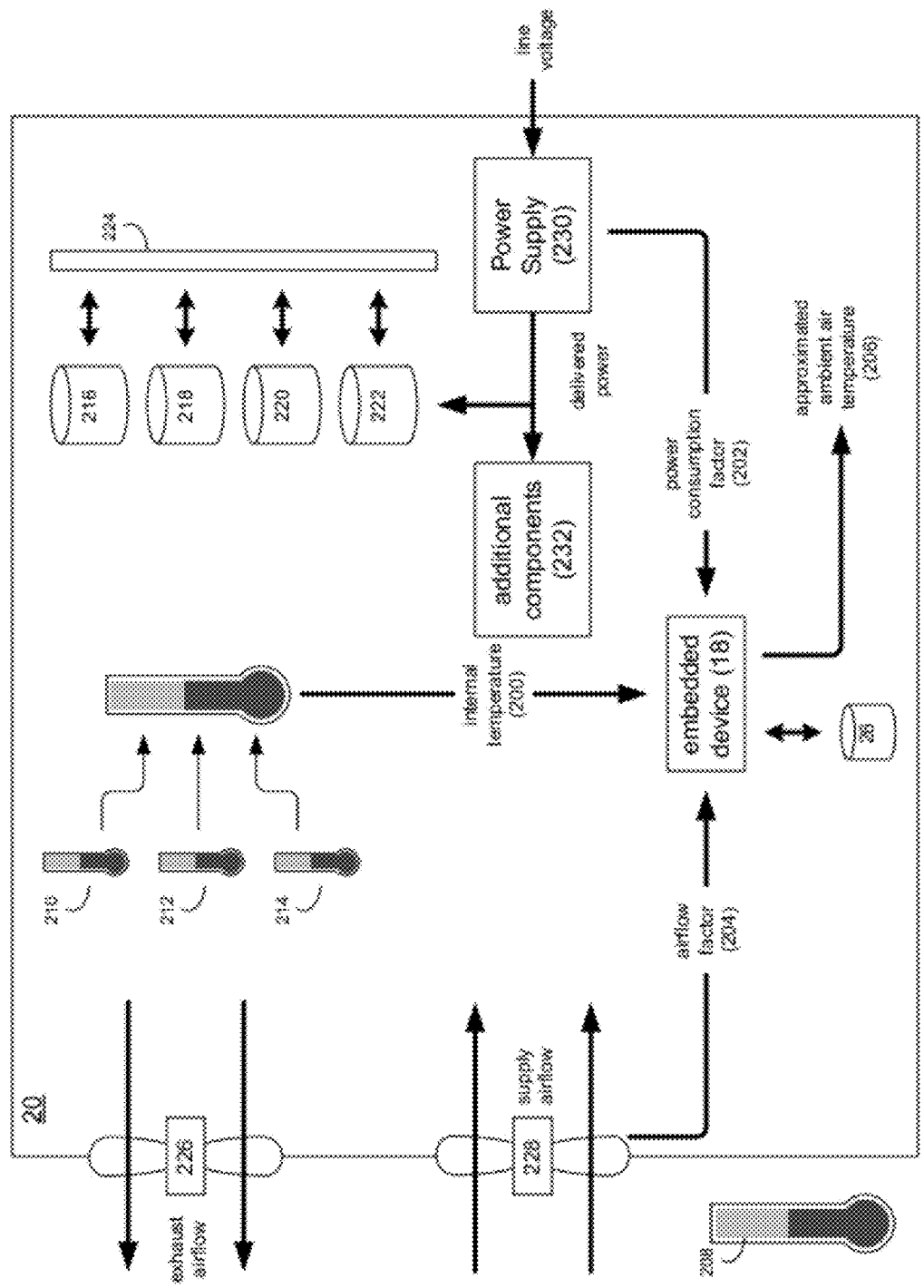
FIG. 3 is a diagrammatic view of a device that executes the temperature calculation process of FIG. 1.

Referring to FIGS. 1-3, there is shown temperature calculation process 10. Temperature calculation process 10 may include one or more of computer process 12 and device process 14. Accordingly and for the following discussion, the temperature calculation process will be described generally as temperature calculation process 10, with the understanding that temperature calculation process 10 may include one or more of computer process 12 and device process 14.

Computer process 12 may be executed (in whole or in part) by computer 16 (e.g., a single server computer, a plurality of server computers, a general purpose computer, a laptop computer, or a notebook computer). Device process 14 may be executed (in whole or in part) by embedded device 18. Embedded device 18 may be incorporated into, coupled with, or a portion of computing device 20, examples of which may include but are not limited to a server, a bridge, a router, a brouter, a switch, a gateway, a hub, a protocol convertor, a proxy device, a firewall, a network address translator, a multiplexor, a modem, a repeater, a storage module, and a power supply module. Examples of embedded device 18 may include but are not limited to a microprocessor and memory, an embedded controller, a single board computer, a programmable logic controller, and/or a portion of computing device 20.

As will be discussed below in greater detail, temperature calculation process 10 may determine 100 an internal temperature 200 of a computing device (e.g., computing device 20); determine 102 a power consumption factor 202 (in watts) of the computing device; and determine 104 an airflow factor 204 (in CFM or cubic meters per minute) of the computing device. Temperature calculation process 10 may generate 106 an approximated ambient air temperature 206 based upon internal temperature 200, power consumption factor 202, and airflow factor 204.

Computer 16 may be coupled to network 22 (e.g., the Internet, an intranet, a local area network, a wide area network, and/or an extranet). Computer 16 may execute an operating system, examples of which may include but are not limited to Microsoft Windows Vista™, or Redhat Linux™.

The instruction sets and subroutines of computer process 12 (which may be grouped to form one or more software modules), which may be stored on a storage device 24 coupled to computer 16, may be executed by one or more processors (not shown) and one or more memory architectures (not shown) incorporated into computer 16. Storage device 24 may include but is not limited to a hard disk drive, a tape drive, an optical drive, a RAID array, a random access memory (RAM), or a read-only memory (ROM).

The instruction sets and subroutines of device process 14 (which may be grouped to form one or more software modules), which may be stored on storage device 26 coupled to the computing device (e.g., computing device 20), may be executed by one or more processors (not shown) and one or more memory architectures (not shown) incorporated into the computing device (e.g., computing device 20). Storage device 26 may include but is not limited to a hard disk drive, a tape drive, an optical drive, a RAID array, a random access memory (RAM), a read-only memory (ROM), or a flash memory device.

While computer 16 is shown hardwired to network 22, this is for illustrative purposes only and is not intended to be a limitation of this disclosure, as other configurations are possible and are considered to be within the scope of this disclosure. For example, computer 16 may be wirelessly coupled to network 22 via e.g., a wireless communication channel (not shown) established between computer 16 and a wireless access point (not shown), which may be directly coupled to network 22.

While computing device 20 is shown hardwired to network 22, this is for illustrative purposes only and is not intended to be a limitation of this disclosure, as other configurations are possible and are considered to be within the scope of this disclosure. For example, computing device 20 may be wirelessly coupled to network 22 via e.g., a wireless communication channel (not shown) established between computing device 20 and a wireless access point (not shown), which may be directly coupled to network 22.

The Temperature Calculation Process:

As discussed above, temperature calculation process 10 may determine 100 an internal temperature 200 of a computing device (e.g., computing device 20); determine 102 a power consumption factor 202 of the computing device; and determine 104 an airflow factor 204 of the computing device. Temperature calculation process 10 may generate 106 approximated ambient air temperature 206 based upon internal temperature 200, power consumption factor 202, and airflow factor 204.

Approximated ambient air temperature 206 generated by temperature calculation process 10 may be indicative of the air temperature external to but proximate computing device 20 (as symbolized by thermometer 208). By generating approximated ambient air temperature 206 (as opposed to directly reading ambient air temperature 208), computing device 20 does not need to include an external temperature sensor.

The manner in which temperature calculation process 10 determines 100 internal temperature 200 may vary depending upon the configuration of computing device 20. For example, computing devices (such as computing device 20) may include one or more temperature sensors (represented graphically as sensors 210, 212, 214). Examples of sensors 210, 212, 214 may include but are not limited to one or more thermistors.

Sensors 210, 212, 214 may be positioned at various locations within computing device 20. For example, assume that computing device 20 includes a plurality of storage devices 216, 218, 220, 222 that are coupled to midplane assembly 224. One or more of temperature sensors 210, 212, 214 may be mounted on/positioned proximate midplane assembly 224 so that a midplane temperature may be determined 108 by temperature calculation process 10. Further still, one or more of temperature sensors 210, 212, 214 may be positioned proximate exhaust fan 226 so that the sensor(s) may sense the temperature of the exhaust airflow so that an exhaust temperature may be determined 110 by temperature calculation process 10.

When determining 104 airflow factor 204, temperature calculation process 10 may monitor 112 a rotational speed of one or more cooling fans (e.g., supply fan 228 and/or exhaust fan 226). Specifically and moving forward on the premise that the volume of air moved per fan rotation is known, airflow factor 204 (which may be indicative of the total quantity of air moved through computing device 20) may be determined 104 provided that the rotational speed of the cooling fan(s) is known.

When determining 102 power consumption factor 202, temperature calculation process 10 may need to take into account a few factors (e.g., the position of the temperature sensor(s) being monitored. For example, assume that the temperature being monitored is the temperature of the exhaust airflow via a temperature sensor positioned proximate exhaust fan 226. Since (in this example) the exhaust airflow passing through exhaust fan 226 is indicative of an homogenized temperature of the inside of computing device 20, temperature calculation process 10 may determine 114 a total power consumption of computing device 20. The total power consumption of computing device 20 is of interest because exhaust fan 226 is exhausting all of the air from computing device 20.

Conversely, the calculations may be different if the temperature sensor(s) were positioned to monitor the temperature within a specific portion of computing device 20. In that case, temperature calculation process 10 may isolate the energy supplied to the portion of computing device 20 proximate the sensor(s) being monitored.

For example, assume that the sensor(s) being monitored are located on midplane 224 of computing device 20. Accordingly, the temperature proximate midplane 224 may vary in accordance with the power consumption of the components/circuits proximate the sensor(s) being monitored. Therefore and for this particular example, temperature calculation process 10 may determine 114 a total power consumption of computing device 20 and subtract 116, from the determined total power consumption of computing device 20, a total power consumption for all non-disk drive devices.

Specifically, assume that temperature calculation process 10 determines 114 that five hundred watts is being provided by power supply 230. However, assume that two hundred of those five hundred watts is being provided to additional components 232 included within computing device 20, examples of which include but are not limited to e.g., storage controllers, link controller cards, etc.). Typically, the power consumptions of certain additional components 232 (e.g., link controller cards) may be known and constant. However, the power consumption of other additional components (e.g., storage processors) may vary. Accordingly, for those additional components that have varying levels of power consumption, additional monitoring may need to be performed to determine the actual power consumption level of the "varying" additional components. Once the power consumption of additional components 232 is determined (via e.g., applying a constant value and/or monitoring actual consumption), this amount (e.g., two hundred watts) may be subtracted 116 from the previously determined 114 total power consumption of e.g., five hundred watts. Accordingly and in this particular example, the power consumption factor 202 for the midplane portion of computing device 20 (i.e., the portion near the relevant temperature sensor(s) is determined to be three hundred watts.

Once temperature calculation process 10 determines 100, 102, 104 internal temperature 200, power consumption factor 202 and airflow factor 204, temperature calculation process 10 may generate 106 approximated ambient air temperature 206. Generating 106 approximated ambient air temperature 206 may include determining 118 a differential temperature and subtracting 120 the differential temperature from the internal temperature measured to define approximated ambient air temperature 206.

When determining 118 a differential temperature, a linear relationship may be utilized. For example, such a relationship may be defined as follows:

$$Y=MX+B$$

wherein Y is the differential temperature, X is the quotient of power consumption factor 202 (in watts) and airflow factor 204 (in CFM or cubic meters per minute). M and B may be constants that may be determined empirically and may vary from device to device and in accordance with the location of the temperature sensors.

Accordingly, when determining 118 a differential temperature, temperature calculation process 10 may determine 220 quotient (X) of the power consumption factor and the airflow factor; determine 222 a product of quotient (X) and first constant (M) and add 224 the product to second constant (B).

In addition to storage processors, other devices have varying levels of power consumption and generate varying levels of heat. For example, disk drives (e.g., storage devices 216, 218, 220, 222) have a considerable level of thermal mass and, therefore, may take considerable time (e.g., thirty minutes) for their temperature to stabilize. Accordingly, when initially started (or after a reset), temperature calculation process 10 may not report approximated ambient air temperature 206 until after such stabilization has occurred. Additionally, temperature calculation process 10 may be configured so that approximated ambient air temperature 206 is not reported while e.g., fault conditions are occurring and/or field replaceable units are removed, When determining 100 the internal temperature, temperature calculation process 10 may be configured to average the temperature reading across sensors and/or across time. For example, temperature calculation process 10 may average temperature readings across time periods from thirty seconds to thirty minutes.

Once temperature calculation process 10 generates 106 the approximated ambient air temperature, the approximated ambient air temperature may be retrieved by user 28 via computing process 12. As discussed above, computing process 12 (which may be executed on computer 16) may interface with device process 14 (which is executed on embedded device 18) via e.g., network 22. Alternatively, the approximated ambient air temperature may be retrieved using computing device 20 if the appropriate interface (not shown) is included within computing device 20.

A number of implementations have been described. Nevertheless, it will be understood that various modifications may be made. Accordingly, other implementations are within the scope of the following claims.

What is claimed is:

1. A method of approximating ambient temperature comprising:
   determining, using a first computing device, an internal temperature of a second computing device;
   determining, using the first computing device, a power consumption factor for the second computing device;
   determining, using the first computing device, an airflow factor for the second computing device; and
   generating, using the first computing device, an approximated ambient air temperature based upon the internal temperature, power consumption factor, and the airflow factor.

2. The method of claim 1 wherein determining an internal temperature includes:
   determining a midplane temperature.

3. The method of claim 1 wherein determining an internal temperature includes:
   determining an exhaust temperature.

4. The method of claim 1 wherein determining an airflow factor includes:
   monitoring a rotational speed of one or more cooling fans.

5. The method of claim 1 wherein determining a power consumption factor includes:
   determining a total power consumption of the computing device.

6. The method of claim 5 wherein determining a power consumption factor further includes:
   subtracting, from the total power consumption of the computing device, a total power consumption of non-disk drive devices.

7. The method of claim 1 wherein generating an approximated ambient air temperature includes:
   determining a differential temperature; and
   subtracting the differential temperature from the internal temperature to define the approximated ambient air temperature.

8. The method of claim 1 wherein determining a differential temperature includes:
   determining the quotient of the power consumption factor and the airflow factor.

9. The method of claim 1 wherein determining a differential temperature further includes:
   determining a product of the quotient and a first constant and adding the product to a second constant.

10. The method of claim 1 wherein at least one of the first and second constants is determined empirically.

11. The method of claim 1 wherein the first computing device is included in the second computing device.

12. A computer program product residing on a non-transitory computer readable medium having a plurality of instructions stored thereon that, when executed by a processor, cause the processor to perform operations comprising:
    determining, using a first computing device, an internal temperature of a second computing device;

determining, using the first computing device, a power consumption factor for the second computing device;

determining, using the first computing device, an airflow factor for the second computing device; and generating, using the first computing device, an approximated ambient air temperature based upon the internal temperature, power consumption factor, and the airflow factor.

13. The computer program product of claim 1 wherein the instructions for determining an internal temperature include instructions for:

determining a midplane temperature.

14. The computer program product of claim 12 wherein the instructions for determining an internal temperature include instructions for:

determining an exhaust temperature.

15. The computer program product of claim 12 wherein the instructions for determining an airflow factor include instructions for:

monitoring a rotational speed of one or more cooling fans.

16. The computer program product of claim 12 wherein the instructions for determining a power consumption factor include instructions for:

determining a total power consumption of the computing device.

17. The computer program product of claim 16 wherein the instructions for determining a power consumption factor further include instructions for:

subtracting, from the total power consumption of the computing device, a total power consumption of non-disk drive devices.

18. The computer program product of claim 12 wherein the instructions for generating an approximated ambient air temperature include instructions for:

determining a differential temperature; and subtracting the differential temperature from the internal temperature to define the approximated ambient air temperature.

19. The computer program product of claim 12 wherein the instructions for determining a differential temperature include instructions for:

determining the quotient of the power consumption factor and the airflow factor.

20. The computer program product of claim 12 wherein the instructions for determining a differential temperature further include instructions for:

determining a product of the quotient and a first constant and adding the product to a second constant.

21. The computer program product of claim 12 wherein at least one of the first and second constants is determined empirically.

22. The method of claim 12 wherein the first computing device is included in the second computing device.

* * * * *